United States Patent
Furuyama

(10) Patent No.: US 7,734,152 B2
(45) Date of Patent: Jun. 8, 2010

(54) RECORDING APPARATUS FOR RECORDING MOTION AND STILL IMAGES

(75) Inventor: Hiroaki Furuyama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1278 days.

(21) Appl. No.: 10/092,090

(22) Filed: Mar. 6, 2002

(65) Prior Publication Data

US 2002/0131771 A1   Sep. 19, 2002

(30) Foreign Application Priority Data

Mar. 12, 2001 (JP) .............................. 2001-068476

(51) Int. Cl.
*H04N 5/91* (2006.01)
*H04N 5/76* (2006.01)

(52) U.S. Cl. .................... 386/120; 386/45; 386/46; 386/125; 386/126

(58) Field of Classification Search .................. 386/38, 386/35, 37, 117, 120, 121, 123, 45, 46, 95, 386/96, 112, 125, 126; 358/906, 909.1; 348/36, 348/222.1, 218
See application file for complete search history.

(56) References Cited

U.S. PATENT DOCUMENTS

| 5,513,010 | A | * | 4/1996 | Kori et al. | 386/104 |
| 5,550,645 | A | * | 8/1996 | Fujimoto | 386/120 |
| 5,991,504 | A | * | 11/1999 | Hori | 386/112 |
| 6,069,994 | A | * | 5/2000 | Kozuki et al. | 386/121 |
| 6,263,148 | B1 | * | 7/2001 | Hori et al. | 386/46 |
| 6,272,280 | B1 | * | 8/2001 | Watanabe | 386/67 |
| 6,584,463 | B2 | * | 6/2003 | Morita et al. | 707/3 |
| 6,771,882 | B1 | * | 8/2004 | Imai et al. | 386/67 |
| 7,133,068 | B2 | * | 11/2006 | Fisher et al. | 348/218.1 |

* cited by examiner

*Primary Examiner*—Jamie J Atala
(74) *Attorney, Agent, or Firm*—Cowan, Liebowitz & Latman, P.C.

(57) ABSTRACT

There is disclosed a recording apparatus having first and second recording modes for recording image signals of one frame in tracks, the numbers of which are different in the first and second recording modes. On the first recording mode, a still image is recorded for a first predetermined period. On the second recording mode, a still image is recorded for a second predetermined period. Lengths of these first and second predetermined periods are respectively set according to the first and second recording modes.

8 Claims, 4 Drawing Sheets

RECORDING APPARATUS FOR RECORDING MOTION AND STILL IMAGES

BACKGROUND OF THE INVENTION

1. Field of the Invention

The present invention relates to a recording apparatus and, more particularly, an apparatus for recording motion and still images.

2. Related Background Art

A digital VCR has hitherto been known for recording/reproducing an image signal as a digital signal on a magnetic tape. Recently, HD Digital VCR Council has presented a DV format as a format of a consumer digital VTR.

In the DV format, there are defined SD Specifications (SD mode, hereinafter) for recording an image signal of NTSC in ten tracks per one frame, and SD High Compression Specifications (SDL mode, hereinafter) for recording an image signal in five tracks per one frame. On the SDL mode, a quantity of data to be recorded is set to about ½ of that of the SD mode, a tape feeding speed is set to ½ of that of the SD mode, and data of one frame is recorded in five tracks. Accordingly, a recording period can be double as long as that of the SD mode with a tape length equal.

As a video camera integral VTR based on such a DV format, there is known one having a photomode for recording still image data of, for example 6 to 7 sec., on a tape for a predetermined period in addition to recording of normal motion image data.

As ID used to detect the still image data, photo picture ID (PPID) is defined in the DV format. The PPID must be recorded continuously for 5 sec.

In the above-described VTR capable of performing recording/reproducing on the SD mode and the SDL mode, the still image may be recorded on the SD mode and the SDL mode. However, since the SDL mode has a smaller number of tracks per one frame compared with that of the SD mode, when the still image data is searched while the tape is fed at a speed higher than that during normal reproducing, even if the PPID data is detected and the searching operation is finished, a recording position of the target still image data is passed, making it impossible to perform accurate searching.

Furthermore, on the photomode, still image data is recorded for a period longer than that of the PPID, normally 6 to 7 sec. Accuracy during searching may vary depending on a recording position of PPID in the period of 6 to 7 sec. No ideas have been presented regarding an optimal recording position of the PPID in the photomode of the SDL mode.

SUMMARY OF THE INVENTION

An object of the present invention is to solve the above-described problems.

Another object of the invention is to accurately detect still image data recorded by a recording mode having a small quantity of information or a small number of tracks per frame.

In order to achieve the above-described object, in accordance with an aspect of the prevent invention, there is provided a recording apparatus, comprising: recording mode setting means for setting a first recording mode for recording image data having a first information quantity per unit time, and a second recording mode for recording image data having a second information quantity larger than the first information quantity per unit time; recording means for recording image data on a recording medium; and control means for controlling the recording means to record on the recording medium still image data and detection data for detecting still image according to recording instruction of the still image, wherein the control means controls the recording means to record on the recording medium the still image data of the first recording mode and the detection data for detecting the still image data for a first predetermined period when the first recording mode is set by the recording mode setting means, and to record on the second recording medium the still image of the second recording mode and the detection data for a second predetermined period different in length from the first predetermined period when the second recording mode is set, and wherein a length of the first predetermined period is set according to the first recording mode, and a length of the second predetermined period is set according to the second recording mode.

These, other objects and features of the invention will become apparent upon reading of the following detailed description of the preferred embodiments with reference to the accompanying drawings.

DETAILED DESCRIPTION OF THE PREFERRED EMBODIMENTS

Hereinafter, description will be made of the preferred embodiment of the present invention.

Figures 1, 1A:
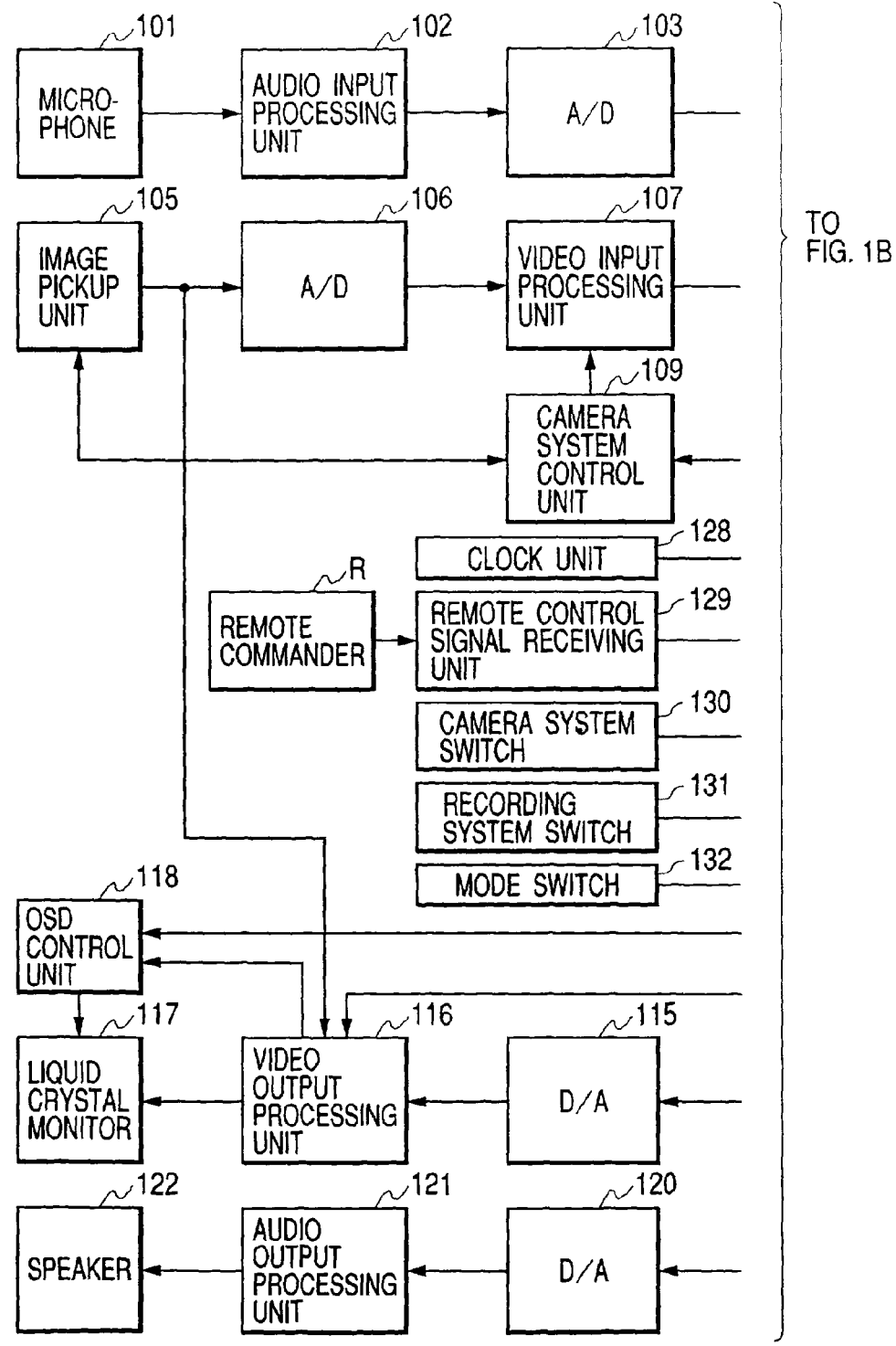
FIG. 1, which is comprised of FIGS. 1A and 1B, is a block diagram showing a configuration of a VTR, to which the present invention is applied.
Figure 1B:
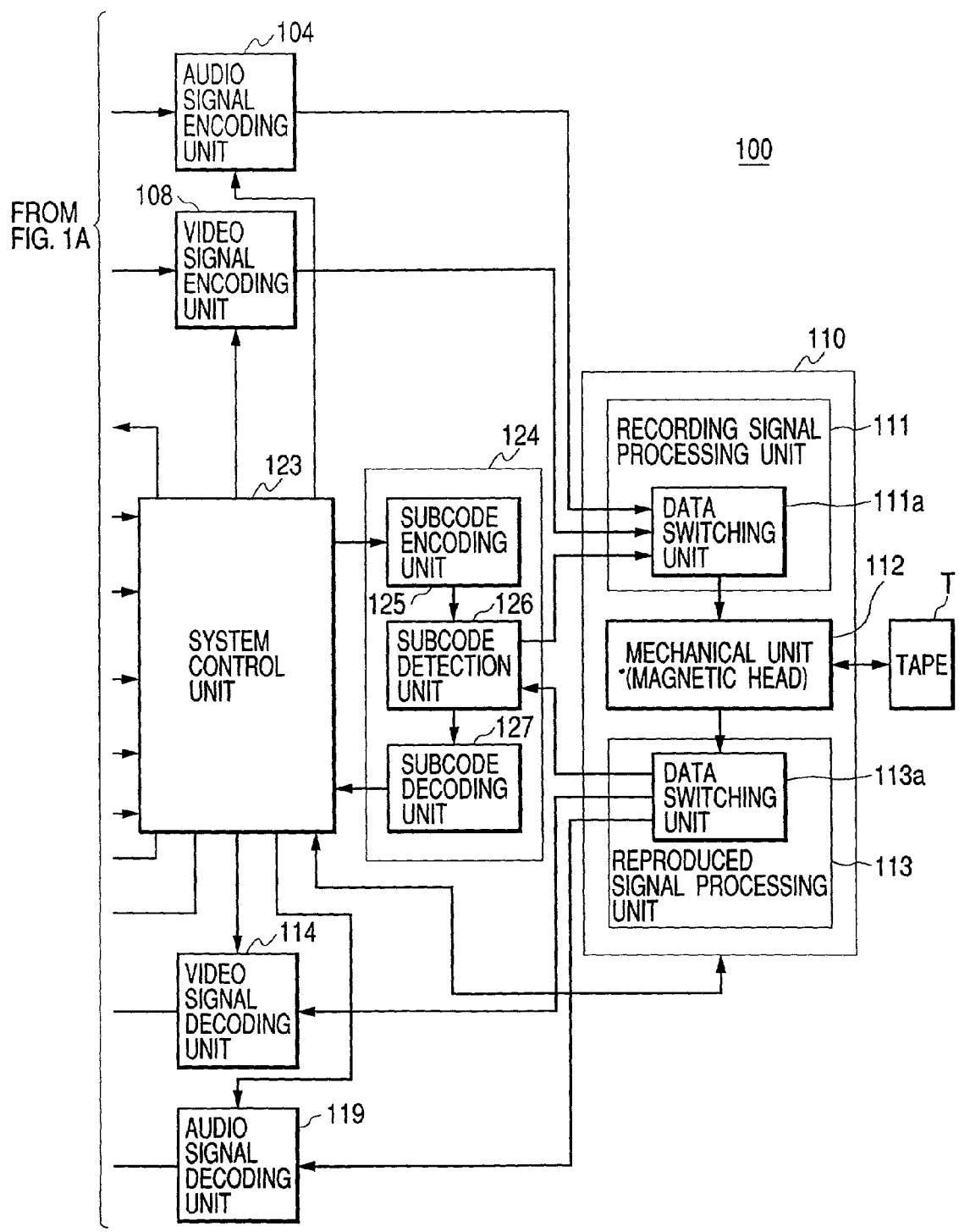

FIGS. 1A and 1B are functional block diagrams of a camera integrated VTR 100, to which the invention is applied. The apparatuses of FIGS. 1A and 1B records/reproduces image data, audio data and the like in the above-described DV format.

In FIGS. 1A and 1B, a reference numeral 101 denotes a microphone for collecting audios; 102 an audio input processing unit for performing predetermined signal processing for an audio signal captured from the microphone 101; 103 an A/D converter for converting an analog audio signal into a digital audio signal; 104 an audio signal encoding unit for encoding an audio signal outputted from the A/D converter 103; 105 an image pickup unit for picking up an image of an object; 106 an A/D converter for converting an analog video signal into a digital video signal; 107 a video input processing unit for performing predetermined signal processing for a video signal subjected to A/D conversion according to an SD mode or an SDL mode; 108 a video signal encoding unit for encoding a video signal; and 109 a camera system control unit composed of a microcomputer or the like to control the image pickup unit 105 and the video input processing unit 107 according to instruction of a system control unit 123.

A reference numeral 111 denotes a recording signal processing unit including a data switching unit 11a for switching and outputting an encoded digital audio signal, an encoded digital video signal, and subcode data; 112 a mechanical unit including a magnetic head for recording a signal outputted from the recording signal processing unit 111 on a magnetic tape T, and reproducing a digital signal recorded on the magnetic tape T; and 113 a reproduced signal processing unit including a data switching unit 113a for switching and outputting the digital audio signal, the digital video signal and the subcode data reproduced from the mechanical unit 112. The recording signal processing unit 111, the mechanical unit 112, and the reproduced signal processing unit 113 constitute a recording/reproducing circuit 110.

A reference numeral 114 a video signal decoding unit for decoding a digital video signal switched and separated by the data switching unit 113a; 115 a D/A converter for converting the decoded digital video signal into an analog video signal; 116 a video output processing unit for performing predetermined signal processing for the analog video signal; 118 an on screen display (OSD) control unit for superimposing various bits of information including a date, time, a menu and the like according to instruction from the system control unit 123; and 117 a liquid crystal monitor for multiplexing and displaying a video signal outputted from the video output processing unit 116 or the video input processing unit 107, and information obtained from the OSD control unit 118.

A reference numeral 119 denotes an audio signal decoding unit for decoding an audio signal outputted from the data switching unit 113a; 120 a D/A converter from converting the decoded audio signal into an analog audio signal; 121 an audio output processing unit for performing predetermined signal processing for the analog audio signal from the D/A converter; and 122 a speaker.

A reference numeral 123 denotes a system control unit; 124 a subcode encoding unit for generating subcode data containing a current date and time generated by a clock unit, or various ID data such as PPID according to instruction from the system control unit 123; 126 a subcode data detection unit for outputting subcode data from a subcode encoding unit 126 to the data switching unit 111a, and detecting and outputting subcode data from the data switching unit 113a to the subcode decoding unit; and 127 a subcode data decoding unit for detecting and outputting subcode data (photographing date, time data, or various ID data such as PPID) from the subcode data detection unit 126 to the system control unit 123. The subcode encoding unit 125, the subcode detection unit 126, and the subcode decoding unit 127 constitute a subcode data processing circuit 124.

A reference numeral 128 denotes a clock unit; 129 a remote control signal receiving unit for receiving a remote control signal from a remote commander R or sending a remote control code to the system control unit 123; 130 a camera system switch including various switches (zooming, focusing and the like) for operating a camera system; 131 a recording system switch including various switches (up-down, and left-right keys, a menu key, a reproducing key, a fast-forward key, winding and stopping keys, a recording trigger key, a photo-key, a photosearch key, and the like) for a recording system and the entire VTR; and 132 a mode switch for selecting a power supply mode (camera, VTR, OFF) of the main body.

The system control unit 123 includes a microcomputer or the like, which is in charge of overall control various functions of the camera integral VTR 100, including a timer function. The system control unit 123 mainly performs mode control, operation mode transition control of each operation block, display control of various information, storage, holding and the like of various photographing modes. Further, following switching of a normal compression recording mode/a high compression recording mode, the system control unit 123 performs system data setting in recording, recording/reproduced signal processing, control of the mechanical unit 112, and the like.

Next, description is made of a recording operation of the camera integral VTR 100 constructed in the above-described manner.

In the digital VTR of the embodiment, a recording mode can be set between the SD mode and the SDL mode, and a user can set a recording mode by the menu selection function of the recording system switch SW 131.

An audio signal captured from the microphone 101 is subjected to predetermined signal processing by the audio input processing unit 102, and then converted into a digital signal by the A/D converter 103, and outputted to the audio signal encoding unit 104. Based on recording mode information from the system control unit 123, the audio signal encoding unit 104 encodes the audio signal according to a currently set recording mode, i.e., the SD mode or the SDL mode, and outputs the encoded audio signal to the data switching unit 111a of the recording signal processing unit 111.

A video signal captured from the image pickup unit 105 is outputted to the A/D converter 106 and the video output processing unit 116. The A/D converter 106 converts the video signal from the image pickup unit 105 into a digital signal, and outputs it to the video input processing unit 107. The video output processing unit 116 selects on the recording mode, the video signal from the image pickup unit 105 based on a control signal from the system control unit 123, supplies it to the liquid crystal monitor 117 to display a video image picked up by the image pickup unit 105.

The video input processing unit 107 performs predetermined signal processing for the digital video signal from the A/D converter 106, according to the SD mode or the SDL mode, and then outputs it to the video signal encoding unit 108. Based on the recording mode information from the system control unit 123, the video signal encoding unit 108 encodes the video signal according to a currently set recording mode, i.e., the SD mode or the SDL mode, and outputs the encoded video signal to the data switching unit 111a of the recording signal processing unit 111. In the embodiment, processing by the video input processing unit 107 and the video signal encoding unit 108 is carried out such that on the SD mode, a quantity of information per one frame can be ½ of that of the SD mode.

The system control unit 123 controls the subcode encoding unit 125 based on current date and time data from the clock unit 128, generates subcode data containing date and time information, and other information, and outputs the subcode data through the subcode detection unit 126 to the data switching unit 111a of the recording signal processing unit 110.

The data switching unit 111a switches and outputs respective data according to a tape recording format defined by the DV format such that a digital audio signal, a digital video signal, subcode data and ITI data can be recorded in predetermined areas of respective recording tracks on a tape T, and then supplies the data to the magnetic head of the mechanical unit 112.

The mechanical unit 112 includes a capstan for feeding the tape T. The system control unit 123 controls a feeding operation of the capstan so as to switch a feeding speed of the tape T according to a set recording mode.

For example, when the SD mode is set, the tape T is fed at a speed V corresponding to the SD mode. When the SDL mode is set, the tape T is fed at a speed V/D corresponding to the SDL mode. Data indicating a recording mode is generated by the subcode encoding unit 125, included into VAUX data by the subcode detection unit 126, and recorded through the data switching unit 111a in a predetermined position of each track on the tape T.

As described above, in the camera integral VTR 100, the digital audio signal, the digital video signal, and the data indicating the photographing date thereof are simultaneously and continuously recorded digitally in different areas on the magnetic tape T.

Next, description is made of a reproducing operation of the camera integral VTR 100.

The digital audio signal, the digital video signal, the subcode data and the ITI data are outputted to the data switching unit 113*a*, and then switched and outputted in times series by the data switching unit 113*a*.

The digital video signal from the data switching unit 113*a* is outputted to the video signal decoding unit 114. Based on the recording mode information from the system control unit 123, the video signal decoding unit 114 decodes the video signal according to the recording mode of the reproduced video signal, and outputs it to the D/A converter 115. The D/A converter 115 converts the decoded video signal into an analog signal, and outputs it to the video output processing unit 116. Based on the control signal from the system control unit 123, the video signal processing unit 116 selects on a reproducing mode, the video signal from the D/A converter 115 and supplies the video signal to the liquid crystal monitor 117 to be displayed.

The digital audio signal from the data switching unit 113*a* is outputted to the audio signal decoding unit 119. Based on the recording signal information from the system control unit 123, the audio signal decoding unit 119 decodes the audio signal according to the recording mode of the reproduced audio signal, and outputs it to the D/A converter 120. The D/A converter 120 converts the decoded audio signal into an analog audio signal, the audio output processing unit 121 performs predetermined signal processing on the converted analog audio signal to output it from the speaker 122.

The subcode data from the data switching unit 113*a* is detected through the subcode detection unit 126 by the subcode decoding unit 127, and entered to the system control unit 123. Then, the system control unit 123 performs time difference correction for the photographing date data based on correction information regarding a time difference, entered beforehand by the user, converts it into character display data, and outputs it to the OSD control unit 118. The OSD control unit 118 converts this character display data into superimposition data, and outputs it with the video signal from the video output processing unit 116 to the liquid crystal monitor 117. The liquid crystal display unit 117 displays the reproduced video and the information of photographing date/time subjected to time difference correction in a superimposing manner.

The subcode detection unit 126 detects information indicating the recording mode of the currently reproduced video and audio data from the VAUX data included in the reproduced data, and outputs it to the system control unit 123. Based on this recording mode information, the system control unit 123 can detect the recording mode of the reproduced video and audio data.

Next, description is made of a recording operation of still image data on the photomode.

The user operates the photokey of the recording system switch SW 131 in recording pause or during motion image data recording. The system control unit 123 stores in an internal memory a image signal of one frame entered in the video input processing unit 107 at a point of time of the photokey operation. Then, the image data of one frame is repeatedly read during a period defined by the SD mode or the SDL mode as described later, and outputted to the video signal encoding unit 108. The image data is then encoded as described above, and recorded as still image. Then, the subcode processing unit 124 and the recording/reproducing circuit 110 are controlled such that the PPID data can be recorded at a predetermined timing.

Next, description is made of an operation of recording images, in an order of a motion image A, a still image A and a motion image B, in a number of helical tracks on the magnetic tape, and searching the still image A held between motion image recording areas.

As described above, there is PPID as data for detecting still image data recorded on the photomode. This is information data for still image searching, defined by the DV format, and it is decided that recording is carried out continuously for 5 sec. In addition, on the SD mode, data of one frame is recorded in ten tracks and, on the SDL mode, data of one frame is recorded in five tracks.

That is, in comparison based on the same number frames, when recording is carried out on the SDL mode, a recording length on the magnetic tape is set to half of that during SD mode recoding.

Figure 2:
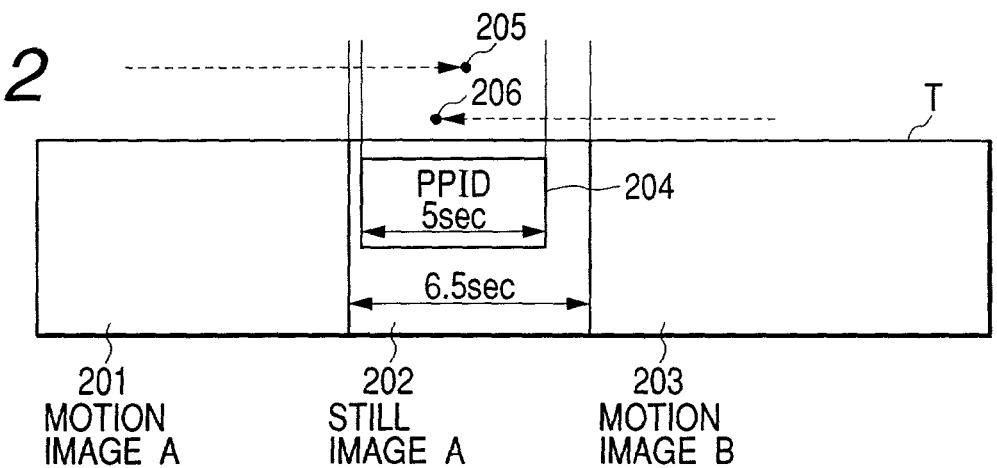
FIG. 2 is a view showing a recording format on an SD mode.

FIG. 2 shows an example of recording motion and still images on the SD mode, where a still image A is recording in an area after a recording area 201 of a motion image A for about 6.5 sec. In this case, substantially simultaneously with still image recording, the PPID is recorded for 5 sec with being superimposed. Then, a motion image B is recorded in a recoding area 203.

When the recorded still image A is searched from the recording area 201 of the emotion image A, the tape T is first fed forward at a speed faster by 9.5 times, the speed is reduced to a normal speed when the PPID is detected, a slowing operation is carried out, then the process is stopped in a position 205 to perform still image reproducing. Then, conversely, when the recorded still image A is searched from the recording area 203 of the motion image B, first, the tape is reversely fed at a speed after by 9.5 times, the speed is reduced to reverse normal speed when the PPIID is detected, a reverse slowing operation is carried out, the process is then stopped in a position 206 to perform still image reproducing. As apparent from the drawing, in either case, still image reproducing operation is finished within a range of the recording area 202 of the still image A.

Figure 3:
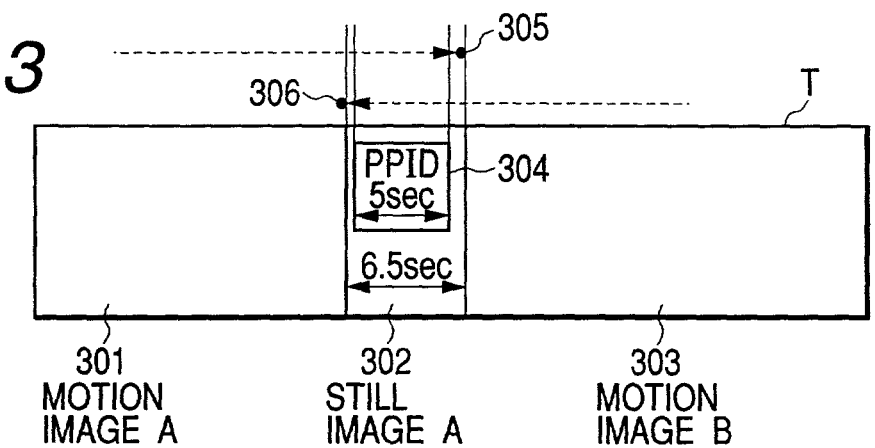
FIG. 3 is a view showing an example of a recording format on an SDL mode.

FIG. 3 shows an example of recording motion and still images on the SDL mode, where a still image A is recorded for about 6.5 sec., subsequently to a motion image A. In this case, substantially simultaneously with still image recording, the PPID is recorded for 5 sec with being superimposed. Then, a motion image B is recorded.

When the recorded still image A is searched from a recording area 301 of the emotion image A, the tape T is first fed forward at a speed faster by 9.5 times, the speed is reduced to a normal speed when the PPID is detected, a slowing operation is carried out, then the process is then stopped in a position 305 to perform still image reproducing. Then, conversely, when the recorded still image A is searched from a recording area 303 of the motion image B, first, the tape is reversely fed at a speed after by 9.5 times, the speed is reduced to reverse normal speed when the PPIID is detected, a reverse slowing operation is carried out, the process is then stopped in a position 306 to perform still image reproducing.

As can be understood from FIG. 3, when the searching is carried out in the forward direction, the still image reproducing is carried out in the position 305 near a boundary of the recording area 302 of the still image A and the recording area 303 of the motion image B. When the searching is carried out in the reverse direction, the recording area 302 of the still image A is passed, and the still image reproducing operation is finished completely in the recording area 301 of the motion image A. Thus, the still image searching operation fails.

Thus, when the still image is searched, control is performed in such a manner that the PPID is detected while the tape is fed at a high speed, and the tape feeding is stopped when the PPID detected. In the case of the still image recorded on the SDL mode, even if the still image is recorded for 6.5 sec., as in the case of the SD mode, since a length of its recording area is only half of that of the SD mode, the recording area of the still image may be passed. To avoid this, a tape feeding speed in searching must be slowed down. However, if the feeding speed is slow, searching time is made longer, worsening usability.

Figure 4:
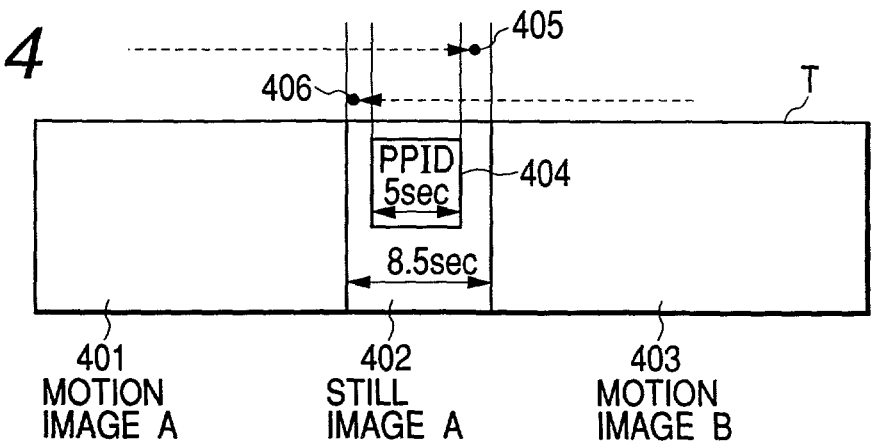
FIG. 4 is a view showing a recording format on a DL mode according to an embodiment of the invention.

FIG. 4 shows an example of recording motion and still images on the SDL mode including the features of the invention, where after a motion image A, a still image A is recording for about 8.5 sec. In this case, PPID is recorded with being superimposed in a center position of a recording area 402 of the still image A. Subsequently, a motion image B is recorded in a recording area 403.

Here, when the recorded still image A is searched from the recording area 401 of the emotion image A, the tape T is first fed forward at a speed faster by 9.5 times, the speed is reduced to a normal speed when the PPID is detected, a slowing operation is carried out, then the process is stopped in a position 405 to perform still image reproducing. Then, conversely, when the recorded still image A is searched from the recording area 403 of the motion image B, first, the tape is reversely fed at a speed after by 9.5 times, the speed is reduced to reverse normal speed when the PPIID is detected, a reverse slowing operation is carried out, the process is then stopped in a position 406 to perform still image reproducing.

As apparent from FIG. 4, in either case, the tape feeding is stopped within a range of the recording area 402 of the still image A.

Therefore, according to the embodiment, when the still image is recorded on the SDL mode, by setting a still image recording period to about 8.5 sec., and the recording position of the PPID in the center position of the still image recording area, it is possible to search the still image at a high tape feeding speed equal to that in searching of the still image data recorded on the SD mode.

Figure 5:
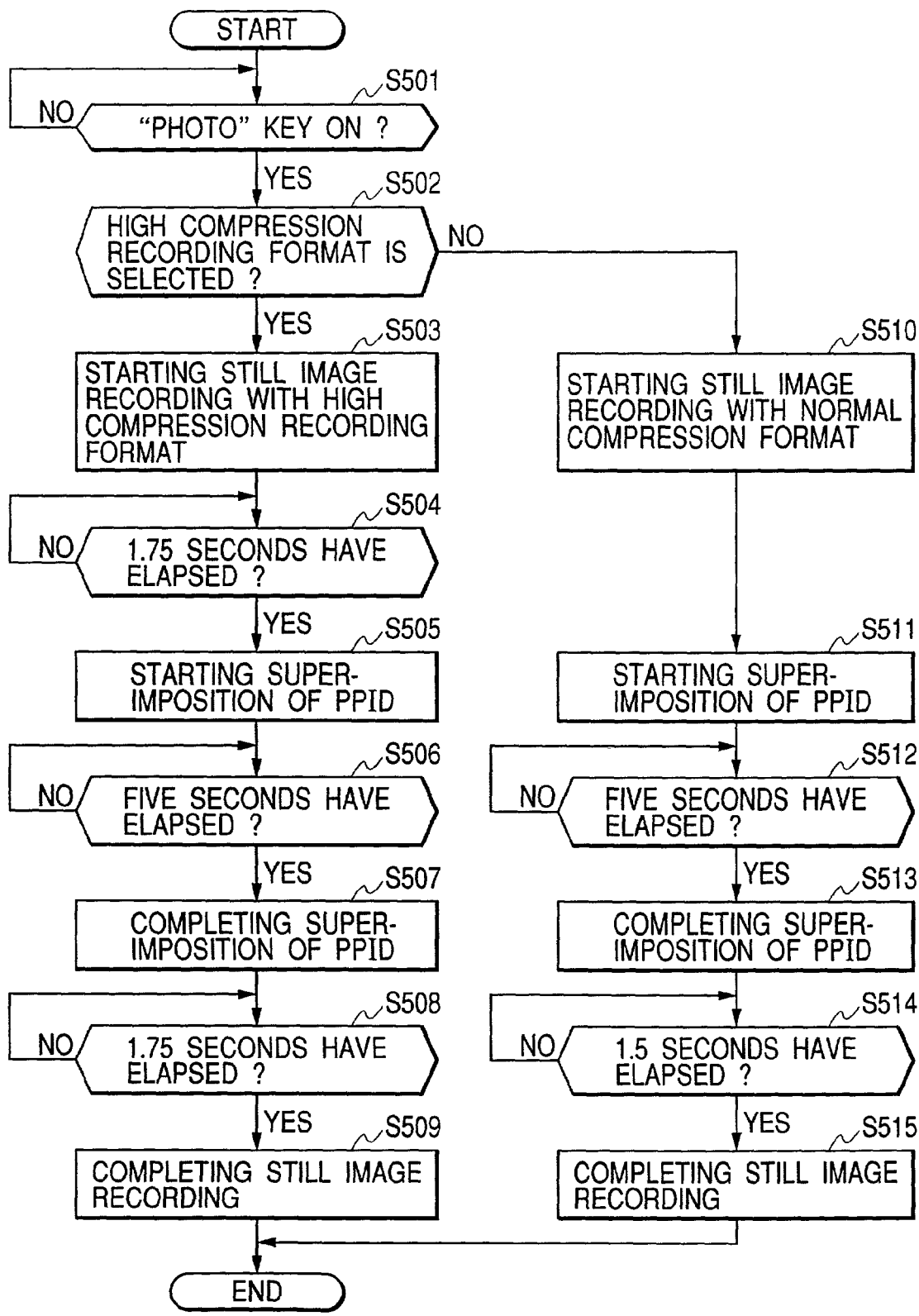
FIG. 5 is a flowchart showing an operation on a photomode according to the embodiment of the invention.

Next, description is made of a control operation of the system control unit 123 when the invention is applied to still image recording on the SDL mode, by referring to a flowchart of FIG. 5.

In FIG. 5, photokey detection for instructing starting of still image recording is carried out in S501 and, after the photokey is depressed, the process is branched to S502. In S502, a currently set recording format is detected. If an SDL mode is selected, the process proceeds to S503. If an SD mode is selected, the process proceeds to S510. Selection of a recording mode is set beforehand by a menu operation or the like.

In S503, feeding of the tape T at a speed set according to the SDKL mode is started, recording of still image data encoded according to the SDL mode is started as described above, the internal counter of 1.75 sec., is started, and the process waits for an end of the counter in S504. After a passage of 1.75 sec., from the start of recording, recording of the PPID is started in S505, the internal counter of 5 sec., is started, and the process waits for an end of the counter in S506.

Then, after a passage of 5 sec., the recording of the PPID is finished in S506, the internal counter of 1.75 sec., is started again, and the process waits for an end of the counter in S508. After a passage of 1.75 sec., the still image recording-on a high compression recording format is finished in S509.

In S510, feeding of the tape T at a speed set according to the SD mode is started, recording of still image data encoded according to the SD mode is started as described above, and recording of the PPID is started in S511. Then, the counter of 5 sec., is started, and the process waits for an end of the counter in S512. After the end of the counter, the recording of the PPID is finished in S513, the counter of 1.5 sec., is started, and the process waits for an end of the counter in S514. After the end of the counter, the still image recording on the SD mode is finished in S515.

Next, description is made of an operation of searching the still image data recording in the above-described manner.

When the photo search key of the recording system switch SW 131 is operated, the system control unit 123 controls a capstan driving unit of a recorder unit 22 such that the tape T can be fed forward or backward at a predetermined high speed faster than a normal speed, for example at a speed faster by 9.5 times than that in recording.

Then, when the PPID reproduced by the recording/reproducing circuit 110, and detected through the subcode detection unit 126 and the subcode decoding unit 127 is entered, the system control unit 123 outputs a control signal to the recording/reproducing circuit 110 as described above, the feeding speed of the tape T is reduced to a normal or reverse normal speed, and then the process proceeds to still image reproducing.

Therefore, according to the embodiment, by setting the recording period on the still image recording mode of the SDKL mode longer than that of the SD mode, and the recording position of the ID data for still image detection substantially in the center of the still image recording area, it is possible to surely detect the still image data recorded on the SD mode and the still image data recorded on the SDL mode while feeding the tape at the same feeding speed in searching.

The embodiment has been described by way of example, where the invention is applied to the VTR having the SDLK mode for recording the image data of one frame in the five tracks, and the SD mode for recording the same in the ten tracks. The invention is not limited to this, and it can be similarly applied to, for example a case where still image data is recorded on a mode for recording in an n number of tracks per one frame, and on a mode for recording in an m (m>n) number of tracks.

Furthermore, the recording periods on the photomode were respectively set to 6.5 sec., and 8.5 sec., on the SD and SDL modes. Other periods may be set as long as they are longer than 5 sec., of the recording period of the PPID, and the recording period on the SDL mode is longer.

Many widely different embodiments of the present invention may be constructed without departing from the spirit and scope of the present invention. It should be understood that the present invention is not limited to the specific embodiments described in the specification, except as defined in the appended claims.

What is claimed is:

1. A recording apparatus comprising:

an imaging unit configured to image an object and output moving image data;

a memory configured to store image data of one frame of the moving image data output from the imaging unit;

a compressing unit configured to compress information quantity of the moving image data output from the imaging unit and information quantity of the image data of one frame stored in the memory;

a recording unit configured to move a magnetic tape and record the moving image data output from the compressing unit and repeatedly record the image data of the same one frame output from the compression unit as still image data in a plurality of tracks formed on the magnetic tape, wherein the recording unit records the moving image data and the still image data so that the image data of one frame is recorded in an n number of tracks (n is an integer of 1 or more) on the magnetic tape in a first recording mode for recording moving image data and still image data each having a first information quantity per one frame and records the image data and the still image data so that the image data of one frame is recorded in an m number of tracks (m is an integer greater than n) on the magnetic tape in a second recording mode for recording moving image data and still image data each having a second information quantity larger than the first information quantity per one frame;

a recording mode setting unit configured to set a recording mode of the recording apparatus between the first recording mode and the second recording mode;

an instruction unit configured to provide a still image recording instruction to record a still image; and a control unit configured to control the recording unit so as to start recording repeatedly on the magnetic medium still image data of the same one frame in response to the still image recording instruction provided by the instruction unit and to stop recording repeatedly the still image data of the same one frame after the still image data of the same one frame is repeatedly recorded on the magnetic tape a predetermined number of times, wherein the control unit changes the predetermined number of times of repeatedly recording the still image data, in accordance with the recording mode set by the recording mode setting unit, and, wherein the control unit controls the recording unit such that if the second recording mode is set by the recording mode setting unit, recording repeatedly the still image data of the same one frame is stopped after the still image data of the same one frame is repeatedly recorded on the magnetic tape a second predetermined number of times in response to the still image recording instruction, and if the first recording mode is set by the recording mode setting unit, recording repeatedly the still image data of the same one frame is stopped after the still image data of the same one frame is repeatedly recorded on the magnetic tape a first predetermined number of times larger than the second predetermined number of times in response to the still image recording instruction.

2. An apparatus according to claim 1, wherein the control unit controls the recording unit to record detection data for detecting the still image data recorded on the magnetic tape with the still image data in response to the still image recording instruction for a predetermined time period.

3. An apparatus according to claim 2, wherein if the first recording mode is set by the recording mode setting unit, the control unit controls the recording unit to record the detection data for the predetermined period substantially positioned in the middle of the repeated recording of the first predetermined number of times.

4. An apparatus according to claim 2, wherein if the second recording mode is set by the recording mode setting unit, the control unit controls the recording unit to record the detection data for the predetermined period from the start of the repeated recording of the second predetermined number of times.

5. An apparatus according to claim 1, wherein the recording unit records the image data of one frame in an 2×n number of tracks (n is an integer of 1 or more) on the magnetic tape in the second recording mode.

6. An apparatus according to claim 1, wherein the second recording mode is set according to SD specifications defined by HD Digital VCR Council, and the first recording mode is set according to SD High Compression Specifications defined by HD Digital VCR Council.

7. An apparatus according to claim 6, wherein the detection data is a photo picture ID (PPID) defined by HD Digital VCR Council.

8. A recording apparatus compressing information quantity of moving image data stored in a memory and image data of one frame of the moving image data stored in the memory, recording the compressed image data on a plurality of tracks formed on a magnetic tape moved such that the image data of same one frame of the moving image data is repeatedly recorded as still image data while recording the moving image data, and including a mode switch for setting a recording mode of the recording apparatus between a first recording mode for repeatedly recording the still image data having a first information quantity per one frame on the magnetic tape and a second recording mode for repeatedly recording still image data having a second information quantity larger than the first information quantity per one frame on the magnetic tape, wherein the recording apparatus records the image data of one frame in an n number of tracks (n is an integer of 1 or more) on the magnetic tape in the first recording mode and records the image data of one frame in an m number of tracks (m is an integer greater than n) in the second recording mode, wherein the recording apparatus starts repeatedly recording on the magnetic tape the still image data of the same one frame in response to a still image recording instruction and to stop repeatedly recording the still image data of the same one frame after the still image data of the same one frame is repeatedly recorded on the magnetic tape a predetermined number of times, wherein the recording apparatus changes the predetermined number of times of repeatedly recording the still image data, in accordance with the recording mode set by the mode switch, and wherein the recording apparatus records the image data such that if the second recording mode is set by the mode switch, recording repeatedly the still image data of the same one frame is stopped after the still image data of the same one frame is repeatedly recorded on the magnetic tape a second predetermined number of times in response to the still image recording instruction, and if the first recording mode is set by the mode switch, recording repeatedly the still image data of the same one frame is stopped after the still image data of the same one frame is repeatedly recorded on the magnetic tape a first predetermined number of times larger than the second predetermined number of times in response to the still image recording instruction.

* * * * *